United States Patent
Weisswange

(10) Patent No.: US 10,166,919 B2
(45) Date of Patent: Jan. 1, 2019

(54) VEHICLE WITH A DRIVER SEAT AND AT LEAST ONE PASSENGER SEAT AND A METHOD FOR PROVIDING A CO-DRIVER AND/OR AT LEAST ONE FELLOW PASSENGER WITH INFORMATION ON A CURRENTLY EXPERIENCED DRIVING SITUATION

(71) Applicant: HONDA RESEARCH INSTITUTE EUROPE GMBH, Offenbach/Main (DE)

(72) Inventor: Thomas Weisswange, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 15/683,925

(22) Filed: Aug. 23, 2017

(65) Prior Publication Data

US 2018/0056864 A1 Mar. 1, 2018

(30) Foreign Application Priority Data

Aug. 30, 2016 (EP) ..................................... 16186205

(51) Int. Cl.
*B60Q 1/00* (2006.01)
*B60Q 9/00* (2006.01)
(Continued)

(52) U.S. Cl.
CPC ............. *B60Q 9/00* (2013.01); *B60W 40/08* (2013.01); *B60W 50/14* (2013.01); *B60K 2350/903* (2013.01); *B60W 2550/20* (2013.01)

(58) Field of Classification Search
None
See application file for complete search history.

(56) References Cited

U.S. PATENT DOCUMENTS

| 9,132,840 B1 | 9/2015 | Szybalski et al. |
| 2007/0126604 A1* | 6/2007 | Thacher ................. G01C 21/26 340/995.13 |
| 2016/0159366 A1* | 6/2016 | Tsuyunashi ........... B60W 40/09 340/439 |

FOREIGN PATENT DOCUMENTS

| EP | 2 889 723 A1 | 7/2015 |
| WO | WO 2005/016701 A2 | 2/2005 |

(Continued)

OTHER PUBLICATIONS

European Search Report dated Feb. 16, 2017 corresponding to European Patent Application No. 16186205.7.

*Primary Examiner* — Adolf Dsouza
(74) *Attorney, Agent, or Firm* — Squire Patton Boggs (US) LLP

(57) ABSTRACT

The invention is related to a method and vehicle comprising a driver seat and at least one passenger seat for providing a co-driver and/or fellow passenger with information on a currently experienced driving situation. In an estimating unit at least one driver parameter is estimated. The driver parameter describes at least one aspect of current driving action performed by the driver of the vehicle. Furthermore, in the estimating unit at least one traffic situation parameter is estimated describing at least an aspect of the traffic situation encountered by the vehicle. From the at least one driver parameter and/or from the at least one traffic situation parameter then information that is related to the currently experienced driving situation is generated. This information is then output to a co-driver and/or fellow passenger via a dedicated interface unit.

27 Claims, 3 Drawing Sheets

(51) Int. Cl.
 *B60W 50/14* (2012.01)
 *B60W 40/08* (2012.01)

(56) References Cited

FOREIGN PATENT DOCUMENTS

| | | |
|---|---|---|
| WO | WO 2007/145566 A1 | 12/2007 |
| WO | WO 2014/068892 A1 | 5/2014 |
| WO | WO 2014/177758 A1 | 11/2014 |

\* cited by examiner

VEHICLE WITH A DRIVER SEAT AND AT LEAST ONE PASSENGER SEAT AND A METHOD FOR PROVIDING A CO-DRIVER AND/OR AT LEAST ONE FELLOW PASSENGER WITH INFORMATION ON A CURRENTLY EXPERIENCED DRIVING SITUATION

BACKGROUND

Field

The invention is related to a vehicle that is driven by a driver and is capable of further transporting at least a co-driver and/or at least one fellow passenger wherein the vehicle is equipped with an interface unit such that the co-driver and/or at least one fellow passenger is provided with information on a currently experienced driving situation and corresponding method. The invention furthermore regards a system including such vehicle and also a communication terminal being connectable to the vehicle.

Description of the Related Art

Over the last years, driver assistance systems have been developed that ease the tasks of driving the driver is confronted with. It is obvious that at the same time such driver assistance systems increase the safety for all passengers of a vehicle, such as a car. The driver operates the driver assistance systems and in return the driver will be informed by the assistance system about a current state of the vehicle, for example, as far as necessary for the driver to perform a driving action in a currently experienced traffic situation or in an upcoming traffic situation. With respect to the driver himself, such information that is provided by the advanced driver assistance system is sufficient. Furthermore, interfaces that are designed for being used by a driver for operation of the driver assistance system or more generally for operation of the vehicle are arranged at a vehicle in such a way that the driver's distraction is reduced as far as possible. On the other side this means that for example a display which is used for outputting information to a driver is arranged at a position and at an angle of the dashboard such that a co-driver or a fellow passenger cannot see what is currently displayed on the display. As furthermore the co-driver and the passenger are being driven by the driver information that is provided by an advanced driver assistance system only, may not be sufficient to increase the comfort of such co-driver or passengers also. One source of discomfort and fear of a co-driver or a fellow passenger is the missing knowledge about the mental state of the driver and his perceptions. Of course, the driver himself is aware what he has already seen and what not. But for the passengers or a co-driver, it might increase the comfort while being driven if they could be sure that the driver, for example, already recognized the development of a traffic situation.

For autonomous vehicles, a system has been proposed in U.S. Pat. No. 9,132,840 B1 that informs not only the operator, but also the passengers of a current status of the autonomous driving system. But here, all information that is presented to the passengers of the vehicle (including the operator) does not provide any information about the awareness, attention level of the driver or the like. The system provides information only with respect to decisions that are made by the autonomous driving system.

Thus, in particular for vehicles where a driver is still supervising (semi) autonomous driving or where a driver is only assisted by a driver assistance system, there is a need to inform a co-driver and/or a passenger(s) about aspects related to a current driving situation or a current driving task. Such information is useful for increasing the confidence in the driver's capability or the comfort while being driven.

This object is achieved by a vehicle, system and method according to the independent claims.

SUMMARY

According to the present invention, the vehicle comprises a driver seat and at least one passenger seat so that in addition to a driver at least one passenger, for example a co-driver or a fellow passenger, can be transported by the vehicle. The vehicle in particular is a car, but of course other vehicles like busses or motorcycles can also be equipped according to the present invention. The vehicle comprises an estimation unit for estimation at least one driver parameter. The driver parameter describes at least one aspect of a current driving action that is performed by a driver of the vehicle. An aspect of such current driving action can be anything that is related to the operation of the vehicle at the moment a driving situation is encountered. It is to be noted that even preparatory actions that are necessary to perform a driving action or maneuver at a later point in time are comprised by the term "aspect of a current driving action". The estimation unit is further configured to estimate additionally or alternatively at least one traffic situation parameter describing at least one aspect of the traffic situation. Such aspect of the traffic situation can be anything that describes a traffic situation partially and may in particular be independent from the aspect related to the driver of the vehicle. The vehicle further comprises an information generating unit for generating from the at least one driver parameter and/or from the at least one traffic situation parameter information that is related to the currently experienced driving situation. Such information that is related to the currently experienced driving situation may be any information that is relevant for a co-driver or a passenger in order to help him to judge if the current operation of the vehicle being performed either by the driver himself, or the driver assisted by driver assistance system is suitable with respect to the currently experienced driving situation.

According to the inventive method, the system mounted on the vehicle thus estimates at least one driver parameter and/or at least one traffic situation parameter. From the at least one driver parameter and/or from the at least one traffic situation parameter, information is generated that is then finally output on a dedicated interface unit for outputting such generated information to a co-driver and/or a fellow passenger.

With the present invention, it is thus possible to provide information not only to a driver, but in a way that is easy to recognize for a co-driver and/or fellow passengers. In order to achieve this, there is provided at least one dedicated interface unit for outputting such information to the co-driver and/or fellow passengers.

Contrary to known systems, which at most might use already existing displays for outputting information that is intended to support the driver or operator in driving or operating the vehicle, the present invention comprises a dedicated interface unit, e.g. a display, for a co-driver and/or fellow passengers. Using such dedicated interface units in addition to a driver's interface unit, gives the opportunity to tailor the information that is presented to a person that is being driven. Thus, it is in particular possible to output information on a current awareness of the driver or any other information on the driver with respect to the currently experienced traffic situation so that the co-driver may recognize that the driver is well capable of dealing with all aspects of the current traffic situation or the current driving task. This will necessarily increase confidence that a passenger has while being driven. It is in particular possible to distinguish between the information that is presented to the driver and the passengers. In teaching situations, for example in a driving school, it is then also possible to provide support beyond corrections and thus increase the learning success.

The dedicated interface may either be configured to output the information directly or in a system comprising said vehicle, but furthermore a remote output device like a communication terminal on a display by transmitting the generated information to the communication terminal.

Advantageous aspects and features are defined in the dependent claims.

It is in particular advantageous that the generated information comprises one or a plurality of pieces of information. Each of these pieces of information concerns one of the following: driver intention, driver attention state, driver attention location, driver awareness, driver preparedness, driver's skill, objects and/or areas observed by the driver and a driver's stress level. Furthermore, such piece of information may concern one of the following: a driver assistant system's status, physical state of the vehicle, other traffic objects, prediction results, environmental conditions and environment perception. As it can be recognized from the aforementioned pieces of information, the generated information mainly comprises aspects of two groups of information. The first is everything that is related with the driver and his way of driving the vehicle or operating the vehicle. On the other side information that is generated in order to be provided to the co-driver and/or fellow passenger can comprise information concerning such aspects that are independent from the driver himself. Thus, information from the second group is related to the vehicle or the vehicle's environment.

It is to be noted that the generation of such pieces of information that is listed above from estimated driver parameters and/or estimated traffic situation parameters itself is well known in the art and thus a complete explanation thereof will be omitted. Only to increase the understanding of the process of generating the information in the following a few examples will be given.

A driver intention that is the next driving maneuver that is intended to be performed by a driver may for example be generated from driver parameters like eye direction, switching of turning lights and the like.

A driver attention state and/or a driver attention location can be recognized for example by analyzing an eye direction including change of eye direction that indicates for example perception of a plurality of different objects in the surrounding of the vehicle. It is to be noted, that of course driver parameters that are solely related to the driver can be combined with information that is obtained from other sensors, for example of a driver assistance system, in order to generate the information that is then used for being output to the co-driver or fellow passenger. For example the driver assistance system may itself physically sense the environment of the vehicle and thus objects such as other traffic participants, lane markings and so on can be identified in the surrounding of the vehicle. Then it is possible to analyze if the driver at least shortly looked at all of these objects and thus a driver attention state as well as a driver attention location can be evaluated.

Another information is the driver awareness which is an analysis with respect to the currently experienced driving or traffic situation. In that case it can be evaluated if the driver focuses in fact on objects in the environment of the vehicle that are highly relevant for safely driving in that situation. Which objects are relevant can be determined by a driver assistance system.

The driver's preparedness can be derived from measuring for example a proximity of the driver's feet to the pedals. The closer the driver's feet are to the pedals the better he is prepared for performing for example a braking operation or the like.

Information on driver's skill can be evaluated from an analysis of previously performed driving actions for example by analyzing if a sudden correction regarding a steering angle or sudden braking was necessary even without an obstacle showing up surprisingly.

Furthermore, by use of means for observing the driver such as cameras or the like, it can be analyzed which objects and/or areas in the environment of the vehicle are observed by the driver and thus it can be concluded what aspects of the scene have already been taken into consideration by the driver.

Additional measurements with respect to the driver such as blink rate, heartbeat rate and/or body temperature of the driver may give hints to a driver's stress level and thus giving an information if the driver in fact has everything under control or is unable to cope with the currently encountered traffic situation.

On the other side information that is generated with respect to the vehicle and the surroundings may be based on sensor outputs from sensors that are for example mounted in a distributed fashion over the vehicle. Furthermore, the driver assistance system's status may comprise information on the functionality of the driver assistance system that is at the moment provided. This may include information on the automatic operation of controls of the vehicle but also information if the system is ready to assist the driver in driving.

Other information that is generated from sensing the environment or sensing internal characteristics of the vehicle are related to the physical state of the vehicle and include information on velocity, direction and location of the vehicle. The same physical characteristics may be provided with respect to other traffic objects. But here it is also possible to only provide information on the existence of other traffic objects. Such other traffic objects are sensed for example by radar, lidar or lidar-sensors or by image processing if a camera is used to observe the environment of the vehicle. Systems and methods for identifying such objects and evaluating their physical states are well known in the art.

Furthermore, information regarding environmental conditions like temperature or rain may be generated based on for example the operation state of a wiper that is either switched on by the driver himself or automatically on the basis of a rain sensor of the vehicle.

Another aspect is that information on environment perception is generated. Such information is generated from the result of an analysis of the environment sensing that is performed by the driver assistant system.

It is in particular preferred that not only one such piece of information is output but a plurality of such pieces of information. The dedicated user interface may be for example a display on which such plurality of pieces of information is displayed simultaneously. The co-driver or the fellow passenger(s) is (are) thus provided with plurality of information. The combination of such pieces of information is preferably tailored to the needs of a co-driver and thus deviates from information that is presented to a driver of the vehicle. Such advantage is the result of the dedicated user interface that is provided on the vehicle in addition to a user interface which is used by the driver himself while driving the vehicle.

According to another preferred embodiment the generated information is an indicator representing level for the driver's ability to cope with the current driving situation. Thus, the information that is generated on the basis of the driver parameters and/or the traffic situation parameters is combined and as a result an easy to grasp information is output to the passengers of the vehicle. This might in particular be preferred if otherwise an overload with information has to be feared. Of course, it is possible to combine a plurality of pieces of information which results in a single output but at the same time to provide other pieces of information to the co-driver and/or fellow passengers nevertheless.

Furthermore, it its advantageous if the generated information includes information on the mental capacity of the driver left for interaction with the co-driver and/or fellow passengers for interaction with vehicle controls not necessary for performing the current driving action and/or interaction with other communication devices. This is achieved by estimating how much attention a driver currently has to pay to a traffic situation that is currently encountered. The traffic situation itself can be analyzed from a traffic scene that is physically sensed by sensors of a driver assistant system. Then, depending on the complexity of such traffic situation, it is determined how much attention the driver can pay and based on average mental skills of a driver it is then determined if there is mental capacity left for mentioned interactions. Such interaction may be communication with the co-driver or a passenger but also operation of vehicle controls that are not necessary for driving the vehicle such as climate control, multimedia devices or the like. Of course, such an interaction may also be the use of a communication device such as a mobile phone or the like even if it is operated via a multimedia system of the vehicle.

According to another advantageous aspect the generated information includes a representation of what the driver currently sees. On the basis of for example an eye tracker the eye direction as a driver parameter is estimated and the information generated therefrom is a representation of what the driver currently sees. Thus, for example on a display that is either mounted on the vehicle or connected to the vehicle it can be visualized to the co-driver and passengers what is perceived by the driver. Even without analyzing if the driver is fully aware of every traffic object or other aspect of the traffic scene the co-driver himself (or the fellow passengers of course) can judge by themselves if the driver is aware of the relevant details of the current traffic situation.

According to another advantageous aspect the generated information includes information on upcoming vehicle dynamics. This is in particular useful if the driver assistant system interacts in such a way that is for example accelerates or decelerates the vehicle or corrects a steering angle because it recognized that a change in the physical state of the vehicle is necessary. This has the advantage that the co-driver and the passengers are not surprised if suddenly the vehicle accelerates or the brakes are operated or a lane change is performed. Of course, such information may not only be generated from traffic situation parameters that are determined by the driver assistant system but also on the basis of driver parameters. Driver parameters that indicate for example that the driver intends to perform a lane change is a quick look into the mirror while at the same time the driver's hand or fingers are moved towards a switch for switching on the turning signals. Also if it can be sensed by a proximity sensor that a driver's foot approaches the brake paddle for example an information on an upcoming braking action can be generated.

It is to be noted that of course there may be provided a plurality of dedicated interface units. In particular for each passenger seat at least one dedicated interface unit may be provided. Each such dedicated interface unit may be one of: a display screen, an interactive touch screen, a plurality of light emitting elements, a sound emitting device, a head up display and a communication interface. The communication interface is particularly suitable to enable communication between an external communication terminal and the vehicle. Thus, it is possible to transmit the generated information to the external communication terminal in order to use a display provided on such communication terminal. Such communication terminal. Such communication terminal may be for example a mobile communication device like a mobile phone or a tablet or the like. A light emitting element according to the present invention may consist of a plurality of light emitting diodes for example but also one or a plurality of icons that are illuminated selectively based on the information that is generated and that is to be provided to the co-driver and/or fellow passengers.

It is furthermore preferred that the vehicle additionally comprises an output information determining unit. With aid of such information output determining unit, it is possible to automatically determine which information is output and/or the timing of outputting such information. The output information determining unit is in particular configured to perform such determination on the basis of at least one of: a driver input, a co-driver input, a fellow passenger input, preference settings or one out of a plurality of co-driver/fellow passenger types. In case that the output information determining unit determines which information is to be output on the basis of a driver input, it is possible for the driver to define which information his passenger(s) shall be presented. On the other side, it is also advantageous that by an input of a co-driver or a fellow passenger, he/she can request for particular type of information he or she wants to be provided with. Furthermore, preference settings may be used so that the driver and/or the co-driver/fellow passenger can set and store particular types of information or pieces of information he or she wants to be displayed. In addition to the pieces of information or type of information that the passenger requests, it is also possible to define in such preference settings that are stored in a memory of a vehicle prototypical situations. The prototypical situations can then be compared with the currently encountered traffic situation and thus the output information determining unit can decide in which situation information has to be output at all. Of course, the different aspects can also be combined. This means that the output information determination unit on the one side determines which information has to be output if such output is to be enabled. On the other side, by performing the comparison between the real traffic situation and the stored prototypical situations, the output information determining unit then decides if in the current situation the output shall be enabled. Situations may be for example curves in case that a threshold radius of the curve is exceeded, heavy traffic situations, highway driving, fast speeds, parking, weather conditions.

The output information determining unit is preferably also connected to the estimating unit. In that case, in the estimating unit it is also possible to estimate a co-driver/fellow passenger state, provided that respective sensing means are present in the vehicle. On the basis of the estimated state of the co-driver/fellow passenger it is then possible to classify the state. One of the states may be "stressed". The output information determining unit can then be configured that the generated information is output only in case that the co-driver/fellow passenger's state is considered to be "stressed". In that case it is avoided that a co-driver/fellow passenger who has confidence in the driving capabilities of the driver is overwhelmed by additional information. It is to be noted that always presenting warnings or the like to a relaxed co-driver/fellow passenger may have an adverse effect on the other side. In such a case, an initially calm and trusting co-driver or fellow passenger may become nervous since he gets the impression that there are every now and then dangerous situations. Thus, by determining a stress level of the co-driver or a fellow passenger, unnecessary output of information may be prevented.

According to another advantageous aspect of the invention, the reaction of a co-driver/fellow passenger in response to information be output is analyzed. This information may be even used in a learning algorithm so that the selection of situations in which information is output and/or the selection of particular pieces of information for output can be improved. On the basis of such analysis, it is possible to update a condition for outputting information or to update the information to be generated for being output. With the learning algorithm, information output of a particular type of information or in situations that caused even a higher stress level of a co-driver or fellow passenger for example can be suppressed. It is obvious that determination of information to be output includes controlling the generation of output information as well as filtering generated information.

Preferably each interface unit is positioned at one of the following locations: In front of the co-driver's seat, in the center console, on the back of the front seats, on the roof in front of the co-driver's seat, on the roof in front of the rear seat and above the console.

BRIEF DESCRIPTION OF THE DRAWINGS

Aspects and features of the present invention will be explained now with respect to the annexed drawings, in which.

DETAILED DESCRIPTION

Figure 1:
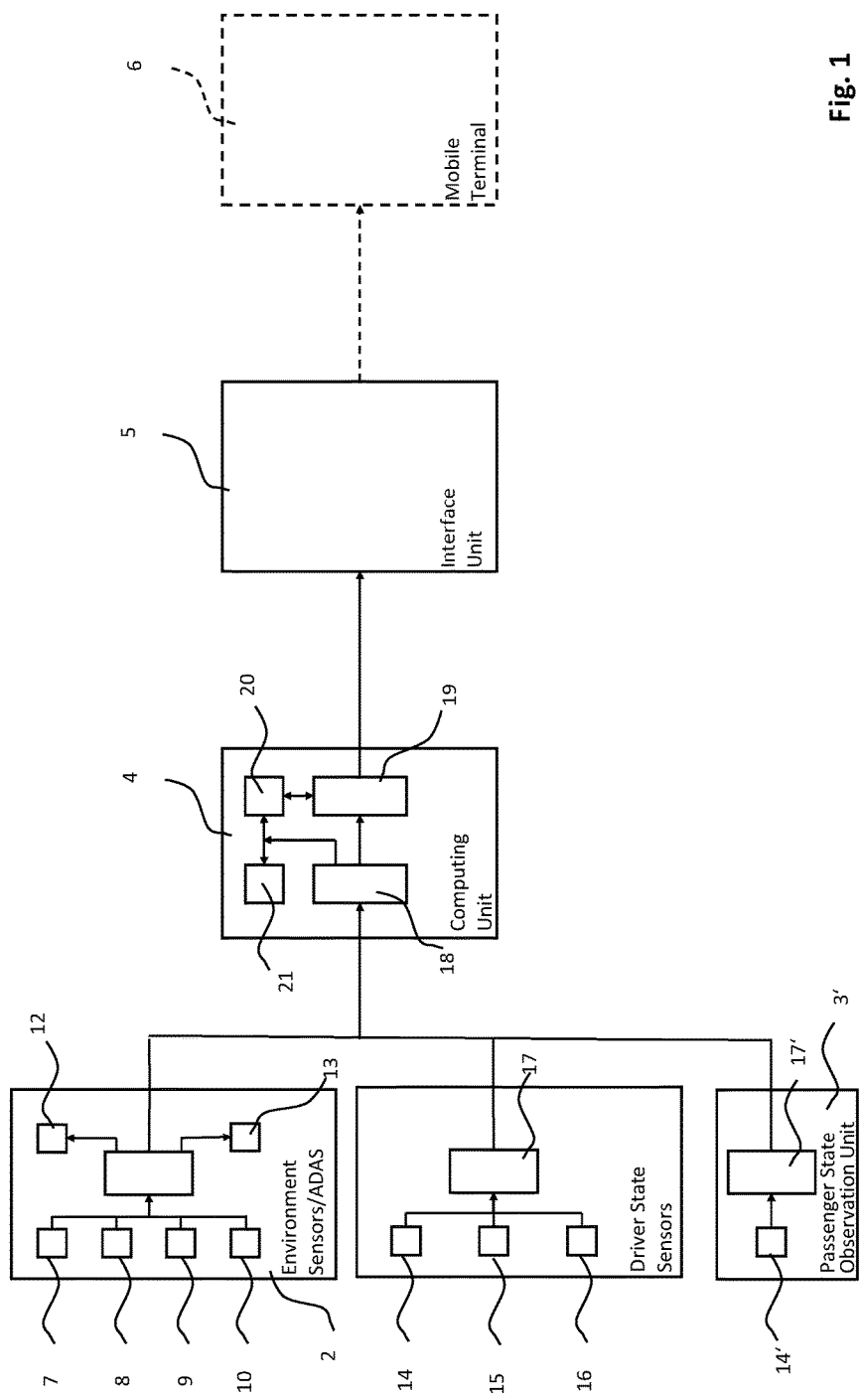
FIG. 1 shows a simplified block diagram of the vehicle according to the present invention, FIG. 2 a simplified illustration of a vehicle's cockpit including an interface unit dedicated for the co-driver.

In FIG. 1, a block diagram is used for illustrating the components of the inventive system 1 that are mounted on a vehicle and also an example for a communication terminal that is connected with the components that are mounted on the vehicle. The system 1 comprises an advanced driver assistance system 2 that includes a plurality of sensors 7-10 which are described later on in more detail. Furthermore, system 1 comprises driver observation means 3 for obtaining information on driver related aspects that are suitable to describe how the driver currently acts in an encountered traffic situation. An output from the advanced driver assistance system (ADAS) and from the driver observation means 3, is supplied to a computing unit 4. The computing unit 4 can either be a single processor that is capable of processing data which is supplied in order to generate an output that can be supplied to a dedicated interface unit 5. The dedicated interface unit 5 may be any device that is capable of visually or acoustically outputting information to a co-driver or a fellow passenger, but the dedicated interface unit 5 may also be a communication interface so that information that is supplied to the dedicated interface unit 5 can be transferred to a mobile communication terminal 6 as indicated in dashed lines. Such mobile communication terminal 6 can be a smartphone, a tablet or the like which is itself equipped with a display for outputting information visually. It is in particular preferred that a dedicated interface unit 5 is provided for each passenger seat.

The advanced driver assistance system 2, which per se is known in the art may comprise one or a plurality of sensors 7-10. Such sensors may comprise for example a radar or a lidar sensor 7 or a laser scanner for perceiving objects in the environment of the vehicle. Furthermore, a camera 8 may be used for providing the ADAS 2 with information that is derived from image processing. In addition, there may be provided a GPS system 9 in order to locate the current position of the vehicle, which is in particular useful in combination with map information 10 that is indicated as a further sensor in the figure. The GPS system 9 and map information are also denoted as "sensors", because they deliver environment information for further analysis like the real sensors 7, 8.

The information derived from the sensors 7-10 and maybe additional information which is obtained for example via car-to-X communication is supplied to a processing unit 11 of the ADAS 2. The output of the processing unit 11 is then supplied to a driver interface unit like a display 12 for informing the driver of the vehicle for example on upcoming risks or the like. Additionally, vehicle controls 13 like brakes or a power steering can be activated by means of a control signal that is generated by the processing unit 11.

Furthermore, the output of the processing unit 11 is supplied to the computing unit 4 for further processing the output from the ADAS 2.

On the other side, the computing unit 4 is connected to the driver observation means 3 that, in the illustrated embodiment, also comprises a plurality of sensors 14-16. Such plurality of sensors may in particular be a camera system 14 that observes the driver while performing a driving action or a driving task. Furthermore, one or a plurality of proximity sensors 15 may be used to determine the relative position of for example the feet of a driver with respect to the pedals or hands with respect to switches, steering wheel or the like. As a last example it should be mentioned that also the controls or switches of the vehicle may be observed with respect to their current switching state so that by such sensors 16 the system 1 can determine if a particular operation (e.g. switching on turning lights, wiper, light, climate control, . . . ) was initiated by the driver of the vehicle.

The ADAS 2 and the driver observation unit 3 both are connected to the computing unit 4 as indicated above. The computing unit 4 which may be any processing means mounted on the vehicle and may comprise either a single processor or a plurality of interconnected processors, comprises an estimating unit 18 and an information generating unit 19. In the estimating unit 18 driver parameters and preferably in addition traffic situation parameters are estimated from the information that is supplied from the ADAS and/or the driver observation means 3. On the basis of the estimated parameters, then in the information generation unit 19, information is generated that is considered to be relevant for a co-driver or a fellow passenger in order to allow him to judge a current traffic situation himself or at least to be prepared with respect to an upcoming driving operation or traffic situation. Which information is generated in the information generating unit can depend on the type of dedicated interface unit 5 that is used for providing the information to the co-driver and/or fellow passengers. It is in particular possible to combine the driver parameters with the traffic situation parameters in order to generate an information that provides the co-driver and/or fellow passengers with an overall interpretation. It can for example be advantageous only to indicate that currently the driver is not distracted but is fully aware of any relevant object of the currently encountered traffic situation. Thus, in that case the traffic situation parameters that are basically derived from an analysis that is provided by the ADAS 2 are combined with the result of the observation of the driver. For the passengers it may then be sufficient that they are informed that the driver is able to cope with the current traffic situation. According to other embodiment it is of course also possible to provide more detailed information. The passenger himself can then draw his own conclusions. It is also possible to generate the information to be output only on basis of the traffic situation parameters. But it is preferred that the passengers are informed about aspects related to the driver in any case.

As it has been mentioned above already, it is one of the advantages of the present invention that the information that is presented to a passenger (co-driver or fellow passenger) can be tailored to his or her particular needs and is not necessarily the same as the information that is presented to the driver. Furthermore, contrary to the driver, who is always provided with information, it makes more sense to provide passengers only in specified situations with additional information. In order to ensure that only relevant information for the passenger is provided the computing unit 4 comprises an output information determining unit 20. The output information determining unit 20 is connected to the information generating unit 19 but also to the estimating unit 18. With aid of the output information determining unit 20 it is possible to select which information has to be presented to a passenger and/or if such information needs to be presented to the passenger at all. As it is illustrated in FIG. 1 the output information determining unit 20 is connected to the information generating unit 19 but it is evident that both unit may be integrated into one unit. In order to select the information that has to be presented to a passenger it is of course necessary that the output information determining unit 20 receives information on such type of information. Such information can be received from any input/output units through which for example the driver can define which information from the vehicle itself or about himself he/she releases so that it might be output to his passengers. On the other side it is also possible by using the same input/output unit or an individual one for each of the passengers that the passengers input information in which they are interested to receive. In that case by the output information determining unit 20 the information generating unit is for example controlled to generate only information that is allowed to be presented because it is released by the driver and/or that is requested by a passenger. Of course, each of the passengers may input his own request. If an interface unit 5 is provided for each of the passengers then individual combinations of pieces of information may be output via each interface unit 5.

The release of the information by the driver or the request for information by the co-driver may either cause an immediate output of the respective information or the driver's input information on released information and passenger's input information on requested information may be stored as preference settings. In the preference settings it is also possible for a passenger to define situations when he would like to receive such information. He can for example select from a specified set including curves, heavy traffic, highway driving, fast speeds, parking, weather conditions or any other traffic situation that may be define and for which the system can ensure that the respective situation is identified with a reasonable liability.

The output information determining unit 20 advantageously has stored an algorithm that is capable to analyze the output from the estimating unit 18 in order to determine if the condition for a particular traffic situation as mentioned above is satisfied. If yes, then the output of the requested or released information is enabled. Of course also a combination of a plurality of such situations can be combined. Thus, it is possible that highway driving is distinguished from driving elsewhere but in the category highway driving it is further distinguished between driving at high speed or driving with low speed. To give an example it is possible to define that if the vehicle is driving on the highway with high speed the passenger receives information about the mental capability of the driver because in such situation it is likely that driving the car or vehicle needs the full attention of the driver. On the other side if the vehicle is driving on a highway with relatively low speed such driving is an easy driving action and thus it can be assumed that having a conversation with the driver is possible.

It is also possible that in the output information determining unit 20 a plurality of different passenger types are stored, each type defining particularities with respect to the type and frequency of information that is presented. Such types may be for example "nervous", "city-person" or "trusting". If "nervous" is selected, then as much information as possible may be presented for example in any situation that can be identified. On the other side if the contrary "trusting" is selected this means that the passenger has confidence that the driver is able to cope with all traffic situations coming up and thus no information about the driver state is presented. "City-person" means for example that this particular passenger is very familiar with driving in the city but gets rather anxious if the vehicle drives on a highway. Thus, information is only presented in case of highway travelling. Each passenger type thus corresponds to one set of preferences stored fixedly by the designer of the system.

According to another aspect of the invention in addition to the driver observation means 3 also passenger state sensors 3' are present. In such a passenger state observation means 3' for example a camera 14' may be present and a moving image that is captured by camera 14' is processed in a further processing unit 17'. Of course also other sensor types may be used in order to determine a passenger's state. A passenger's state gives an indication on the stress level of the passenger and such a stress level may be used to determine if information needs to be output to the passenger. Other aspects that may help to determine the passenger's stress level may be eye tracking, skin resistance or the like. The stress level of the passenger is determined in the estimating unit and the result of such analysis is forwarded to the output information determining unit 20. In the output information determining unit 20 the estimated stress level of the passenger is compared to a threshold and if the stress level exceeds a certain threshold, then the amount of information that is presented is increased, for example. Of course, it is also possible that below the threshold no information is provided at all, whereas if the threshold is exceeded a predetermined amount of information is presented in predetermined traffic situations.

If the stress level of the passenger is estimated on the basis of an output from a passenger state observation means 3', it is furthermore possible to provide a learning algorithm in a learning algorithm unit 21. In the learning algorithm unit 21 information about a change in stress level before and after the information is output can be evaluated. The learning unit 21 is thus connected to the estimating unit 18 and the output information determining unit 20. On the basis of the output of the learning algorithm unit 21 it is then possible to update conditions which cause when satisfied outputting information. Thus, when a result of the evaluation by using the learning algorithm indicates that presentation of a particular type of information or presenting information in a particular traffic situation does not result in a reduction of the passenger's stress level, then in the future the conditions for providing such information may be updated accordingly. If on the other side the evaluation indicates that a particular information in no situation improves the stress level of the passenger, then such information will not be provided in the future at all. Vice versa, information for which it is evaluated the passenger stress level can be reduced will be presented more often.

Another approach to ensure that the amount of information that is presented to any of the passengers does not annoy the passengers is to output information only when a change in values or situation context triggers the output of information. For example a symbol indicating a future braking operation is only displayed when the driver moves his/her foot. Another example presenting attention information on the driver only in case that the attention level of the driver changes, in particular, if it decreases. Displaying information caused by a change of value or a situation context may be maintained for a predetermined time interval and after that displaying this information ends. The information will then be displayed again only if a further change can be observed.

Up to now all the examples and embodiments have been explained with respect to a single vehicle that includes all the units necessary or beneficial for the present invention. But in particular the learning algorithm may be performed externally. In that case the driver's state is analyzed on board but the results are forwarded to an external server. By doing so it is possible to use information from a plurality of vehicles in order to improve the result of the learning algorithm. The learning method in that case is applied by a server that is connected to all the vehicles that are equipped with the invention.

Although it has been described above that the users may use preference settings or their states are estimated to influence the type and timing of information that is presented, it is of course also possible and might even be preferred that the information type and also the time of display (meaning the situation in which an information shall be displayed) is chosen by the designer based on expert knowledge or user studies.

Figure 2:
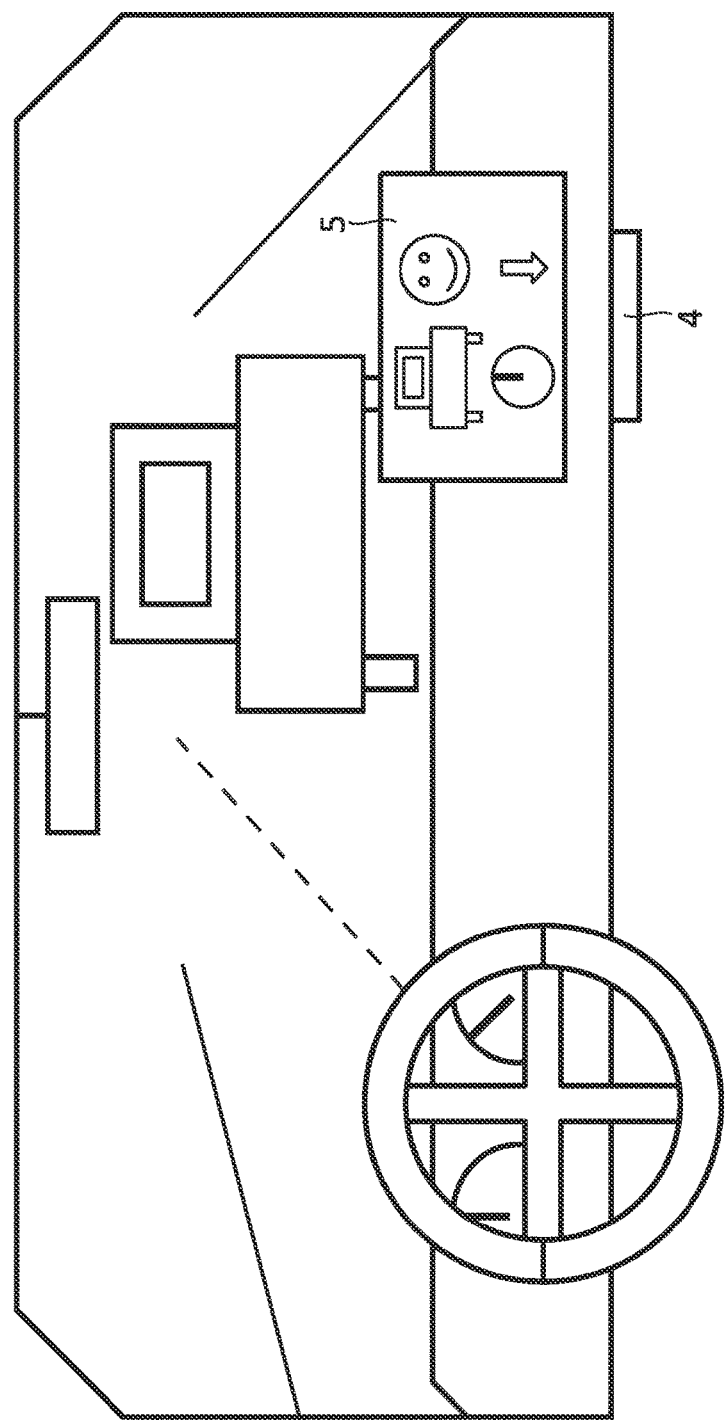

FIG. 2 shows a simplified illustration of a vehicle according to the present invention.

As it can be seen in FIG. 2 a dashboard is provided with a display unit as an interface unit 2 which is positioned directly in front of a co-driver. On the display unit there is shown on the left upper side what is perceived by the driver, namely the car preceding the own vehicle, and an icon on the upper right side that indicates that the driver is well aware of any relevant aspect of the scene. Such icon can be presented for example if the driver's attention level and skill level exceed a threshold. On the lower left side the current speed is indicated to the co-driver which in the present case is achieved by displaying the same speedometer as the one which is present in front of the driver.

Finally, an arrow being directed downwards is used in order to indicate that the next manoeuvre or the next driving action that is coming up is a deceleration of the vehicle. This is one example for information that is independent from a driver state but is very helpful for the comfort of the passenger. Even if the co-driver himself will not recognize the vehicle driving in front of the own vehicle being slower than the own vehicle he will not be surprised by the deceleration of the vehicle. It is to be noted that in that regard it does not matter if a vehicle is decelerated by the system due to semi-automated driving or automatic driving or if the vehicle is slowed down by an action that is performed by the driver. On the other side outputting such information to the driver as well would rather distract his concentration.

Figure 3:
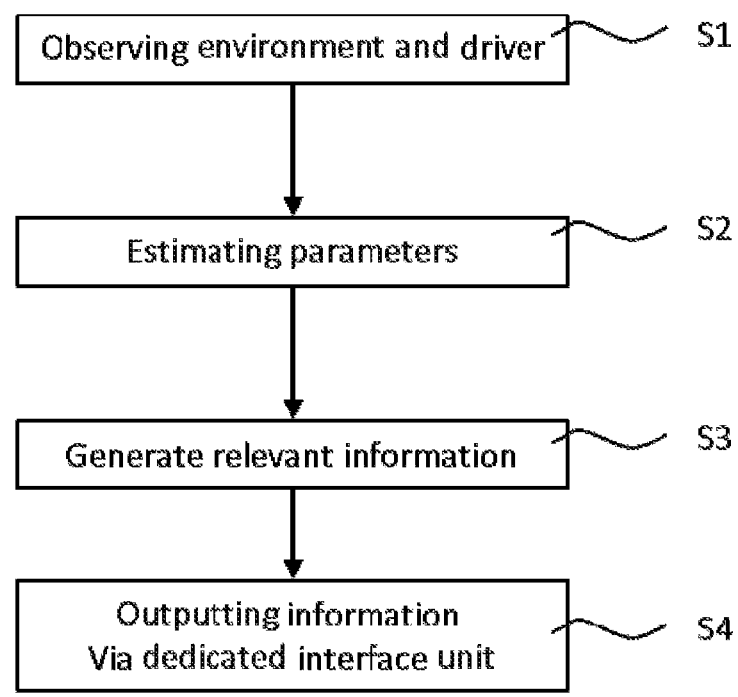
FIG. 3 a simplified flow chart for explaining the method according to the present invention.

FIG. 3 finally shows a simplified flow chart mentioning the main method steps according to the present invention. At first in step S1 the driver and the environment of the vehicle are observed in order to provide the system with information related to the traffic scene and the driver. From this information that is mainly gathered by the sensors 7 to 11 and 14 to 16 that are mounted on the vehicle driver parameters and/or traffic situation parameters are estimated in an estimating unit in S2.

On the basis of the output of the estimating unit 19 information is generated in the information generating unit 19 which is considered to be relevant to a co-driver and/or a fellow passenger. The information that is generated in step S3 is then provided to an interface unit 5 for finally outputting the information to the co-driver and/or fellow passenger in step S4. It is to be noted that the information generating step S4 may include the determination as explained above with respect to the output information determination unit 21. It is to be noted that the information that is generated on the basis of the driver parameters and the traffic situation parameters is generated independently from information that is output to inform the driver about a current status of the ADAS for example. Thus, the information that is output to the driver is tailored to the co-driver and the fellow passenger is tailored to the needs of the co-driver and the passengers. This means that in particular information on the driver himself like attention level, attention location or the like is presented and advantageously this information is augmented with information on the current status of the vehicles.

In the following, a few examples shall be given in order to give an impression on the function of the inventive system and method.

As mentioned already above, it is possible to observe a relative position of the driver's foot to the pedals. Such observation can be made using a camera or a proximity sensor. Of course, a plurality of such proximity sensors can be used and it can be distinguished between the feet of the driver and their respective relative position to either of the pedals. The pedals can be throttle, brake pedal and potentially a clutch pedal in case of the vehicle with manual gearshift. In particular, the proximity of the foot to the brake pedal can provide information about preparedness of the driver for a suddenly occurring braking situation, for example in case of a cut-in of a vehicle in front of the own car. The respective output could be an icon display in front of the co-driver (of course also in front of the fellow passengers). The iconic display may give for example an indication about the driver's foot position relative to the brake pedal.

According to another example, a camera device or imaging device can be directed to the driver's face. Thus, the gaze of the driver can be estimated and correlated to traffic objects outside of the vehicle. Here, a combination of the information that is obtained from the driver observation means 3 and the ADAS 2 is used. This correlation gives information if the driver is fully aware of any relevant traffic object like other cars that are involved in the current traffic situation. An output on a dedicated user interface such as a display in front of the co-driver (which is in the following used as example for the interface unit 5 in general) could be an illustration of the traffic scene, showing all objects highlighted that the driver is aware of. Other objects that are perceived by the ADAS 2 can also be displayed on such display and thus, it is possible for the co-driver to judge if the driver will react in a proper way. This example furthermore shows that the inventive system and method is very useful in teaching situations, because the driving teacher can already inform the learning driver that he currently does not take into consideration a particular vehicle that for example has right of way.

According to another example, the display in front of a co-driver shows all currently active ADAS components and the related information. This information can be similar to what is presented to the driver about the operation of the ADAS 2.

Furthermore, the system can measure the driver's current effort or stress level. In that case, if this is the only information that shall be output to the co-driver, it would be sufficient for example to have a series of LEDs in front of the co-driver indicating only an overall stress level for example. If the stress level of the driver is too high, a red LED could be used and on the other side if the driver is relaxed and thus is considered to be able to cope with the current traffic situation, a plurality of green LEDs could be used. If then, for example, only a number of green LEDs is shown, the co-driver can conclude that the driver will be able to talk to him without being overstrained.

According to another example from the sensor outputs in the estimating unit 18 it can be computed what the next intended behavior of the driver will be. Such behaviors or maneuvers or driving actions to be taken may be for example lane change, turning, stopping at red light etc. This intended next behavior of the driver can then be displayed to the co-driver of fellow passengers and thus prepare him for the upcoming experience.

Furthermore, in the estimation unit 18, the driver's skill level with respect to vehicle dynamics can be estimated. Taking furthermore into consideration the physical conditions influencing vehicle dynamics (for example wheel slip) it is then possible to determine the relation between the driver's skill limits and the current dynamic vehicle state. This determined result is then displayed in front of the co-driver.

According to another advantageous embodiment cameras that are mounted in a distributed fashion on the vehicle can be used to produce an image that corresponds to what the driver currently sees. Of course, this could be achieved by a single camera that can be controlled with respect to its orientation. The perspective is determined on basis of eye tracking of the driver. In case of a single camera the direction of the camera will be controlled in line with the eye tracking result. In case of a plurality of cameras mounted fixedly on the vehicle the corresponding image will be generated by processing the images taken by the plurality of cameras.

The invention claimed is:

1. A vehicle, comprising:
    a driver seat;
    at least one passenger seat;
    an estimation unit for estimating at least one driver parameter describing at least an aspect of a current driving action performed by a driver of the vehicle, or at least one current traffic situation parameter describing at least an aspect of the traffic situation;
    an information generating unit for generating, from the at least one driver parameter or from the at least one traffic situation parameter, information related to the currently experienced driving situation;
    an output information determining unit configured to determine with generated information improves comfort of a co-driver or fellow passenger, or when outputting the generated information to improve comfort of the co-driver or fellow passenger, and
    at least one dedicated interface unit for outputting said determined generated information to the co-driver or fellow passenger, and
    wherein the determined generated information is selected to improve comfort of the co-driver or the fellow passenger in a current operation of the vehicle with respect to the current driving situation, and is generated independently from information output to the driver.

2. The vehicle according to claim 1, wherein the generated information comprises one or a plurality of pieces of information, each of the pieces of information concerning one of the following:
    driver intention, driver attention state, driver attention location, driver awareness, driver preparedness, driver's skill, objects or areas observed by the driver, a driver's stress level, a driver assistant system's status, physical state of the vehicle, other traffic objects, prediction results, environmental conditions, or environment perception.

3. The vehicle according to claim 1, wherein
    a plurality of pieces of information is output via said dedicated interface simultaneously.

4. The vehicle according to claim 1, wherein
    said generated information is an indicator representing the driver's ability to cope with the at least one current driving situation.

5. The vehicle according to claim 1, wherein
    said generated information includes information on mental capacity of the driver left for interaction with the co-driver or the fellow passenger, and interaction with vehicle controls not necessary for performing the current driving action or communication devices.

6. The vehicle according to claim 1, wherein
    said generated information includes a representation of what the driver currently sees.

7. The vehicle according to claim 1, wherein
    said generated information includes information on upcoming vehicle dynamics.

8. The vehicle according to claim 1, wherein
    the dedicated interface unit comprises at least one of:
    a display screen, an interactive touch screen, a plurality of light emitting elements, a sound emitting device, a head up display, or a communication interface.

9. The vehicle according to claim 1, wherein
    the dedicated interface unit is positioned at one of the following locations:

in front of the co-driver's seat, in a center console, on the back of front seats, on the roof in front of the co-driver's seat, on the roof in front of the rear seat, or above the center console.

10. The vehicle according to claim 1, wherein
the output information determining unit is configured to determine which information is generated or output, or when the generated information is output on the basis of at least one of: driver input, co-driver input, fellow passenger input, preference settings, or one out of a plurality co-driver/fellow passenger types.

11. The vehicle according to claim 1, wherein
the output information determining unit is configured to enable output of the generated information only when the encountered traffic situation satisfies a predetermined condition.

12. The vehicle according to claim 1, wherein
the output information determining unit is connected to the estimating unit for estimating a co-driver or fellow passenger state, and is configured to allow output of information only if the co-driver or fellow passenger state is classified as being stressed.

13. The vehicle according to claim 12, wherein
the vehicle comprises an analysis unit for analyzing a change in the estimated co-driver or fellow passenger state in response to the output information.

14. The vehicle according to claim 13, wherein
a condition for outputting information is updated based on the analysis result.

15. A system comprising a vehicle according to claim 1 having a communication interface as the dedicated interface unit, the system further comprising a mobile communication terminal with a display and being connectable via the communication interface to receive said generated information for output on the display.

16. A method for providing a co-driver or at least one fellow passenger with information on a currently experienced driving situation, the method comprising:
estimating at least one driver parameter describing at least an aspect of a current driving action performed by a driver of the vehicle, or at least one current traffic situation parameter describing at least an aspect of the driving situation;
generating, from the at least one driver parameter or from the at least one traffic situation parameter, information related to the currently experienced driving situation;
determining which generated information could improve comfort of the co-driver or fellow passenger, or when outputting the generated information to improve comfort of the co-driver or fellow passenger, and
outputting said generated information to the co-driver or fellow passenger via a dedicated interface unit, and
wherein the determined generated information is selected to improve comfort of the co-driver or the fellow passenger to judge a current operation of the vehicle with respect to the current driving situation, and is generated independently from information output to the driver.

17. The method according to claim 16, wherein the generated information comprises one or a plurality of pieces of information, each of the pieces of information concerning one of the following:
driver intention, driver attention state, driver attention location, driver awareness, driver preparedness, driver's skill, objects or areas observed by the driver, a driver's stress level, a driver assistant system's status, physical state of the vehicle, other traffic objects, prediction results, environmental conditions, or environment perception.

18. The method according to claim 16, wherein
a plurality of pieces of information is output via said dedicated interface simultaneously.

19. The method according to claim 16, wherein
said generated information is an indicator representing the driver's ability to cope with the at least one current driving situation.

20. The method according to claim 16, wherein
said generated information includes information on mental capacity of the driver left for interaction with the co-driver or the fellow passenger, and interaction with vehicle controls not necessary for performing the current driving action or communication devices.

21. The method according to claim 16, wherein
said generated information includes a representation of what the driver currently sees or is aware of.

22. The method according to claim 16, wherein
said generated information includes information on upcoming vehicle dynamics.

23. The method according to claim 16, wherein
the determination is performed on the basis of at least one of: driver input, co-driver input, fellow passenger input, preference settings, or one out of a plurality co-driver or fellow passenger types.

24. The method according to claim 16, wherein
output of the generated information is allowed only when the encountered traffic situation satisfies a predetermined condition.

25. The method according to claim 16, wherein
output of the generated information is allowed only if the co-driver or fellow passenger state is classified as being stressed.

26. The method according to claim 16, wherein
a change in the estimated co-driver or fellow passenger state in response to the output information is analyzed.

27. The method according to claim 26, wherein a condition for outputting information is updated based on the analysis result.

* * * * *